(12) United States Patent
Lauper et al.

(10) Patent No.: US 6,792,249 B2
(45) Date of Patent: Sep. 14, 2004

(54) METHOD FOR GENERATING A QUASI-ISOTROPIC MAGNETIC ALTERNATING FIELD

(75) Inventors: Alfred Lauper, Zürich (CH); Matti-Pekkia Aukia, Zürich (CH)

(73) Assignee: Siemens Transit Telematic Systems AG, Industriestrasse, Bronschhofen (CH)

( * ) Notice: Subject to any disclaimer, the term of this patent is extended or adjusted under 35 U.S.C. 154(b) by 0 days.

(21) Appl. No.: 10/347,213

(22) Filed: Jan. 21, 2003

(65) Prior Publication Data

US 2003/0107522 A1 Jun. 12, 2003

Related U.S. Application Data

(63) Continuation of application No. PCT/EP01/06669, filed on Jun. 13, 2001.

(30) Foreign Application Priority Data

Jul. 27, 2000 (EP) .............................. 00116069

(51) Int. Cl.[7] ............................................... H04B 1/34
(52) U.S. Cl. ...................................... 455/95; 343/867
(58) Field of Search ........................ 343/867, 700 MS, 343/703, 725; 455/95, 99

(56) References Cited

U.S. PATENT DOCUMENTS 4,121,216 A * 10/1978 Bunch et al. ............... 343/728
5,258,766 A    11/1993 Murdoch
6,049,705 A *  4/2000 Xue ........................ 455/277.1
6,084,551 A *  7/2000 Aslan ......................... 343/725
6,259,413 B1 * 7/2001 Schmidt et al. ............. 343/742

FOREIGN PATENT DOCUMENTS

FR          2776864         10/1999

OTHER PUBLICATIONS

Derwent Abstract for FR2776864, Richard Kalinowski, Oct. 1, 1999.
Patent Abstracts of Japan, Pub. No. 04361405, Pub. Date. Dec. 15, 1992, Applicant Yagi Antenna Co., Ltd., Application No. 03137627.

* cited by examiner

Primary Examiner—Wilson Lee
(74) Attorney, Agent, or Firm—Jacob Eisenberg; Siemens Transit T.

(57) ABSTRACT

When using a magnetic alternating field to prompt portable electronic tickets, such as smart cards, it is important that the prompting is effected reliably and independent of the position thereof. In order to generate an essentially isotropic magnetic alternating field over a set time interval, one embodiment of the invention involves the use of an antenna array comprising two or three frame antennas. A switching unit supplies, in a sequentially alternating manner, a unit of information to each of the frame antennas so that a quasi-isotropic magnetic alternating field, which is considered over the period of time, is radiated by said frame antennas. This results in reliably prompting tickets that are located in the surrounding area of the antenna arrays.

11 Claims, 6 Drawing Sheets ions CD

METHOD FOR GENERATING A QUASI-ISOTROPIC MAGNETIC ALTERNATING FIELD

CROSS REFERENCE TO RELATED APPLICATIONS CD

The present application is a continuation of and claims priority to International Application number PCT/EP01/06669, filed Jun. 13, 2001 and further claims priority to German patent application number 00116069.6, filed Jul. 27, 2000, the both of which are herein incorporated by reference.

STATEMENT REGARDING FEDERALLY SPONSORED RESEARCH OR DEVELOPMENT

Not applicable.

REFERENCE TO SEQUENCE LISTING, A TABLE, OR A COMPUTER PROGRAM LISTING COMPACT DISK APPENDIX

Not applicable.

BACKGROUND OF THE INVENTION

The present invention concerns a method for the production of a quasi-isotropic magnetic alternating field.

An arrangement is described in FR 2 776 864 A1, which permits production of a magnetic rotating field in a room to electrically feed electrical cards as, for example, electronic tickets.

A wireless communication system is known from WO 98/53420, which enables communication between a terminal and a multiple number of portable objects by a modulated magnetic alternating field.

These portable objects are often developed as so-called smart cards. They are also often described as electronic tickets. Such electronic tickets comprise a receiving module and generally include a transmitting module. They generally have a size of 53×85 mm². The power supply can occur by a built-in energy source such as a battery and/or by a magnetic alternating field. To minimize the energy consumption, a sleep mode is provided for the operation: at entry of such a smart card into such an alternating field, a voltage is induced by an antenna placed on the smart card, by which the concerned smart card can be set into an active mode. If, following this, no further communication takes place the smart card goes back to the energy-saving sleep mode after a determined time. Such methods and designs of execution of such smart cards are known from EP 0 902 353 and from WO 01/20557 A1. The lower energy consumption resulting from this, allows a higher autonomy. Frequencies of the size 6.78 MHz, 13,56 MHz or 27,1 MHz are common for such applications because of the related near field effects.

Because with the transmitted information, a charge might be connected to a received service, for example a ride with a streetcar or a visit of an exhibition room, a particularly reliable prompting and a reliable transmission are required. Such smart cards are used particularly in means of transport in connection with a transmitting device installed in a vehicle. These transmitting devices are preferably placed in the access area. The smart cards which are carried by persons, show a random orientation, also particularly relative to the magnetic alternating field lines and relative to a transmitting device. The required voltage $U_i(t)$ can thereby not always be induced in the antenna of the smart card. The proportional ratio:

$$Ui(t) \sim \frac{d}{dt} \int_A B \, dA$$

applies for the voltage.

A stands for the surface of the smart card and B for the magnetic induction, B and dA are vector size factors and linked together by the scalar product.

SUMMARY OF THE INVENTION

An object of the present invention is based on indicating a method for the production of a magnetic alternating field, so that a sufficient voltage is induced independent from the location of an antenna placed on a smart card relative to a fixed installed antenna array.

This and other objects are addressed by an antenna array comprising three essentially planar frame antennas with at least a winding each, whereby the defined tiers by the three frame antennas are not plane-parallel each by pairs and that the units of information are supplied sequentially to the frame antennas, whereby a quasi-isotropic magnetic alternating field is radiated from the antenna array; the antenna units are of simple constructive and simple wiring structure, so that these can be multiple arranged without any great effort.

The following advantages may additionally be accrued:

i) A simple installment in the area of access of a vehicle or room results from the simple geometric shape of the antenna array with the supplied periodic signals.

ii) A quasi-isotropic magnetic alternating field can also be produced in a larger area, for example in a railway wagon in a cascaded arrangement of the antenna array, with a respective wiring of a cascade or the geometric positioning of the antenna array.

iii) In a cascade of the antenna arrays with the alternating positioning turned by II, these can be executed identically construction- and circuit-wise, so that a simple installment is guaranteed.

iv) The carrier signal and the units of information to be transmitted can be fed into a spot of the co-axial cable in the cascade of the antenna array with the alternating positioning turned by II.

BRIEF DESCRIPTION OF THE SEVERAL VIEWS OF THE DRAWINGS

The novel features and method steps believed characteristic of the invention are set out in the claims below. The invention itself, however, as well as other features and advantages thereof, are best understood by reference to the detailed description, which follows, when read in conjunction with the accompanying drawing, wherein:

DETAILED DESCRIPTION OF THE INVENTION

Figure 1A:
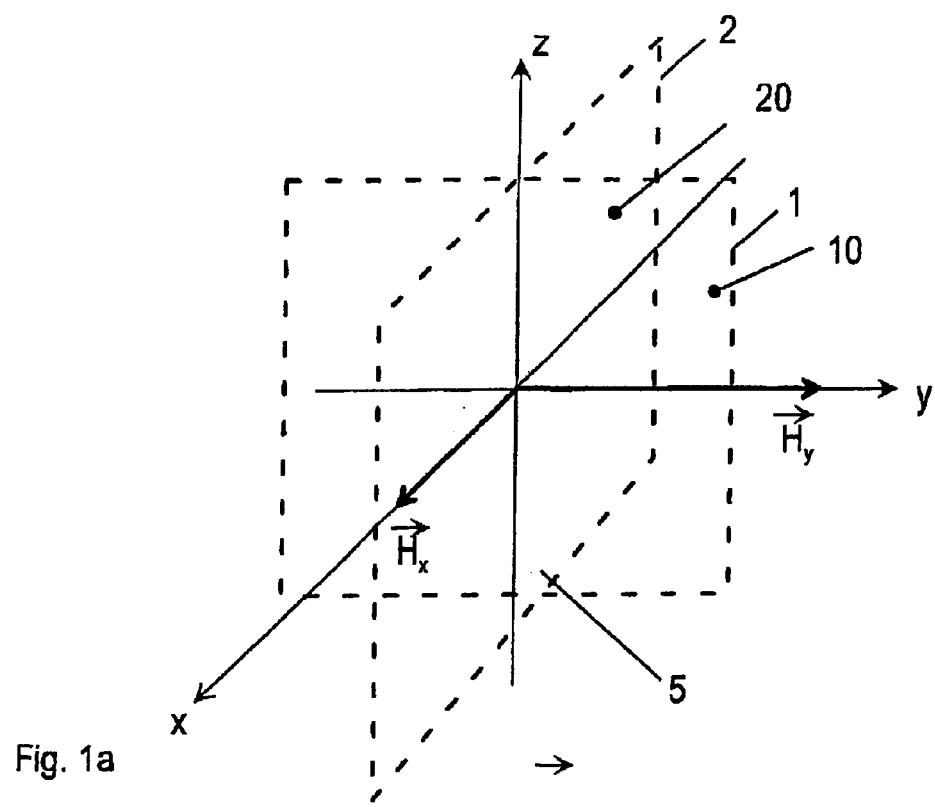
FIG. 1a depicts an antenna array with two correlating orthogonal frame antennas with the associated H-field base vectors.

FIG. 1a depicts two frame antennas which are essentially orthogonally interlaced, disclosed by rectangles 10 and 20 with dashed lines. FIG. 1 depicts a first frame antenna 1 and a second frame antenna 2. A base vector $\vec{H}_x$ and $\vec{H}_Y$ is assigned to the rectangles (and tiers) 10 and 20 as a momentary value, which result in a superposition in a vector $\vec{H}$ (not disclosed in FIG. 1a). In the strict sense there is no isotropic polarization because of the requirement of the simultaneity. Under a quasi-isotropic polarization, an isotropic polarization in a locally limited area (access area) over a determined time is described in the following. The duration of time can for example amount to 0,1 ms corresponding to a frequency of 10 kHz. The isotropy results therefore from successive different directions of the magnet alternating field $\vec{H}$. Currents $I_x(t)$ and $I_y(t)$ are supplied to an antenna array according to FIG. 1a, whereby the ratio of the proportionality applies: $I_x \sim H_x$ and $I_y \sim H_y$. The temporal values are always indicated as an H-field and in particular as an H-field component conditioned on the above proportionality ratio: $H_x = H_0 \cdot \sin \omega t$, $H_x$ stands for the amount of $\vec{H}_x$, $H_y = H_0 \cdot \sin(\omega t + \Pi/2)$.

The value $\omega$ is the angular frequency according to the connection $\omega := 2\Pi \cdot f$, whereby the frequency f amount to for example 6.78 MHz.

Figures 3A, 3B:
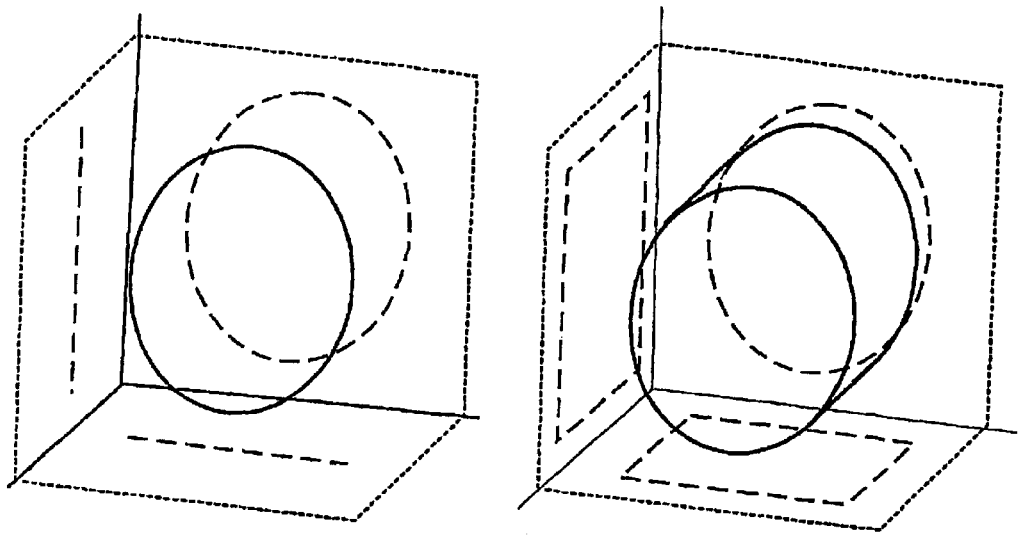
FIG. 3a depicts a disclosure of the resulting magnet alternating field by usage of two frame antennas.
FIG. 3b depicts a disclosure of the resulting magnet alternating field by amplitude modulation of the z-component by usage of three frame antennas.

The resulting vector $\vec{H}: \vec{H}_x + \vec{H}_y$ (the H has an arrow→ on top of it) rotates in a tier according to the disclosure in FIG. 3a with the three projections in an orthogonal coordination system. This polarization is described as circular. According to the above mentioned definition this polarization is regarded as quasi-isotropic. The tiers 10 and 20 of the frame antenna 1 and 2 are not plane-parallel; in a special design of execution, these tiers can be adjustable in the range 90°±δ, to compensate for the influence by metallic walls in the access area. The value of δ can for example be in the rage of 5°.

With such a magnetic alternating field $\vec{H}$, all electronic tickets 7 can be acquired in an access area, which are not plane-parallel to the circulation tier over the whole movement course. Such an electronic ticket is thereby generally carried by a person in a bag or in the wallet. The electronic ticket 7 and the receiving module on it are marked herein with reference 7.

A further improvement for the quasi-isotropy of a magnetic alternating field follows from the usage of a third frame antenna 3. This third frame antenna 3 is disclosed offset to FIG. 1a in FIG. 1b because of reasons of neat grouping. The tier 30 of the third frame antenna 3 is thereby preferably orthogonal to the two tiers 10 and 20 of the frame antennas 1 and 2.

Alternatively, a third frame antenna can be impinged with the following, mentioned under a), b) and c), currents. Again the proportionality ratio $I_z \sim H_z$ applies.

a) Amplitude modulation for the z-component:

$$H_x := H_0 \cdot \sin\omega t$$

$$H_y := H_0 \cdot \sin(\omega t + \Pi/2)$$

$$H_z := H_0 \cdot (\sin\omega_2 t) \cdot (\sin\omega t) =$$
$$= H_0/2 \, (\cos(\omega - \omega_2)t - \cos(\omega + \omega_2)t)$$

$\omega$ stands for the modulation frequency, thereby $\omega_2 \ll \omega$; for example $\omega_2 = 2\Pi \cdot 10$ kHz.

The resulting vector $\vec{H} := \vec{H}_x + \vec{H}_y + \vec{H}_z$ overcoats the rotating cylinder from a mid-point according to the disclosure in FIG. 3b. The three projections on the tiers of a preferably orthogonal coordinate system are disclosed in FIG. 3b as well.

b) Phase modulation for the z-component $H_x = H_0 \cdot \sin \omega t$ $H_y := H_0 \cdot \sin(\omega t + \Pi/2)$ $Hz := H_0 \sin(\omega t + \omega)$, whereby $\phi = \phi(t)$ with a value range $W(\phi) \Box [-\Pi/2, \Pi/2]$, or in another notation: the function $\phi(t)$ shows values in the range −90° to +90°.

c) Frequency offset modulation for the z-component:

$H_x := H_0 \cdot \sin \omega t$ $H_y := H_0 \cdot \sin(\omega t + \Pi/2)$ $H_z := H_0 \cdot \sin(\omega t + \Phi \cdot t')$ whereby: $\Phi$ is constant, $t' := t \bmod T_\Phi$ and mod is a module function generalized on the amount of the real numbers $\Box$. Compared to a $\phi(t) = \Phi \cdot (t \bmod T_\Phi)$ generalized form a frequency offset modulation can be applied for each function with the characteristic: $\phi(t) = \phi(t + T_\phi)$.

In a further embodiment of the present invention, any field vector $\vec{H}$ can be produced in the room by an amplitude and phase modulation of all the currents $I_x$, $I_y$ and $I_y$ being supplied to the three frame antennas.

Figure 6:
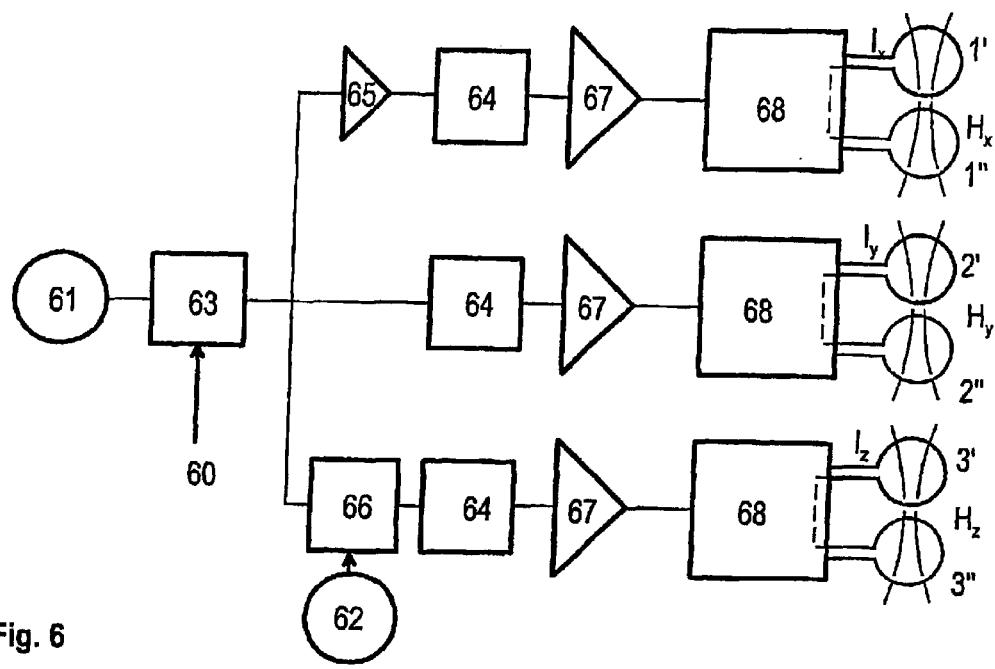
FIG. 6 depicts a modular mimic display for the production of three currents $I_x$, $I_y$ and $I_y$, each supplying a frame antenna.

In FIG. 6 a modular mimic display of a transmitting unit for the production of the currents $I_x$, $I_y$ and $I_y$ and in particular the field components $H_x$, $H_y$ and $H_z$ is shown for the above amplitude modulation described under a). Each two in pairs, essentially parallel frame antennas 1, 1'; 2, 2' as well as 3, 3' are assigned to the transmitting unit 6. A first oscillator produces a square wave signal of the frequency $f_1 = 13.56$ MHz. The first oscillator 61 is topped by an on/off modulator 63, by which the data/information 60 to be transmitted is superimposed on the square wave signal. A pulse-code-modulation can be effectuated by an on/off modulator. The frequency divider 64 is topped by an inverter 65 for the x-component, a phase shift of $\Pi/2$ occurs thereby between the signal for the x and y component. The frequency divider 64 is topped by phase shifting circuit 66 for the z-component, which is supplied with a signal of a second oscillator 62. For the frequency $f_2$ of the second oscillator, as described above under amplitude modulation, the following applies: $f_2 \ll f_1$, for example $f_2 = 10$ kHz. The produced signals by the frequency divider 64 of the frequency $f := f_1/2$ are each supplied to an antenna amplifier 67 and from there supplied to the frame antennas 1, 1'; 2, 2' and 3, 3' over an accommodating connection 68.

The information 60 to be transmitted by an information unit INF in an application as an electronic ticket may include a structure according to table 1.

TABLE 1

| Fields of information | Signification |
| --- | --- |
| CYCLE | Time unit and time reference |
| COMMAND | Orders to the ticket 7 |
| POSITION | Location |
| COURSE | Course number |
| DATETIM2 | Date and time |
| TYPE | Type of the means of transportation |
| ADDRESS | Address of a transmitting/receiving unit located in the vehicle |
| APPLICATION | Application |

Such an information unit INF, also called record INF, may for example comprise a size of (4+1+2+2+4+1+4+2) Byte= 20 bytes. For the security of a transmission and for a possible coding, an additional transmitting capacity is required.

Figure 1B:
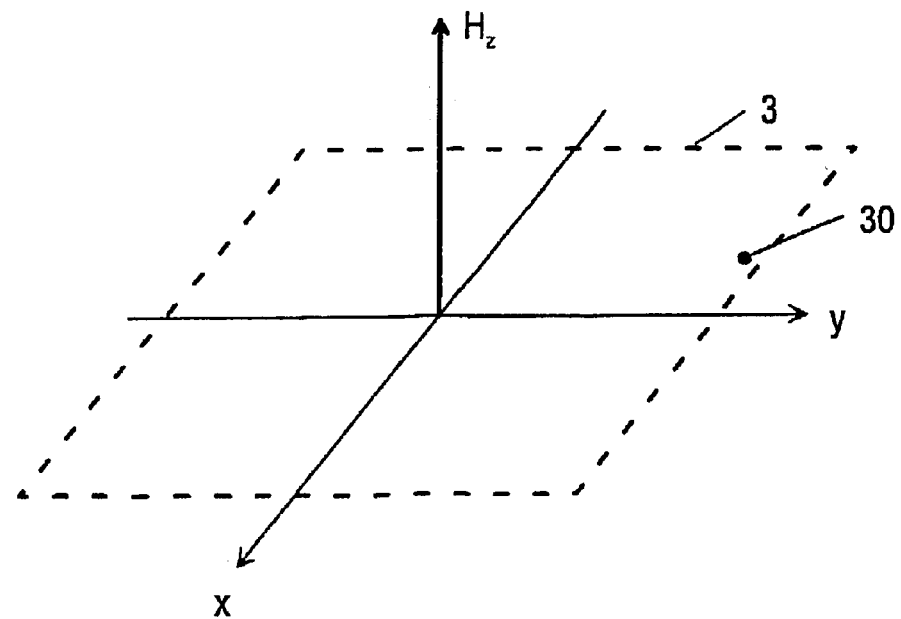
FIG. 1b depicts three correlating orthogonal frame antennas in combination with FIG. 1a with the associated H-field base vectors.
Figure 2:
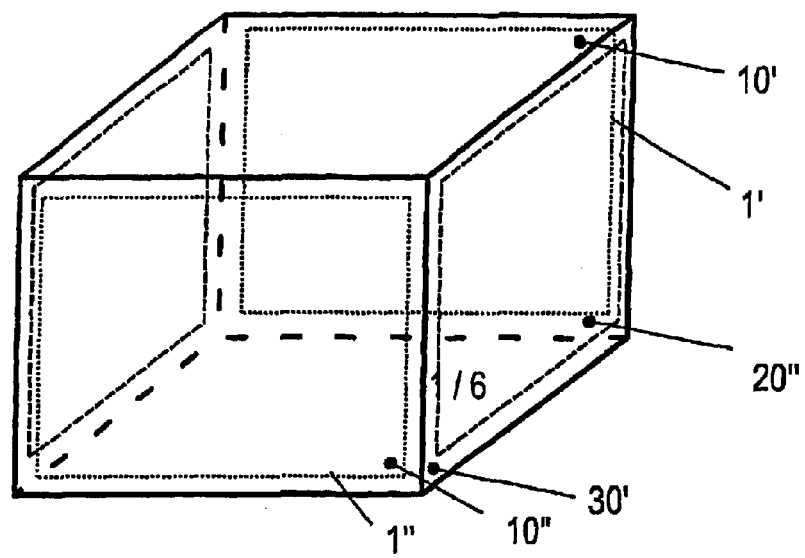
FIG. 2 depicts an arrangement of two correlating parallel frame antennas.

The construction of the antenna array 5 can occur according to FIGS. 1a and 1b, corresponding to the required field strength. Here several windings 4 can be provided for the three frame antennas 1, 2 and 3. Because of reasons of symmetry, the same number of turns is selected preferably for the frame antennas 1 and 2. Deviating from the disclosure in FIG. 6, only one frame antenna 3 located in a tier and can be provided for the z-component, as it is disclosed schematically in FIG. 2. The frame antenna 1 is arranged in two partial frame antennas 1' and 1", which tiers are essentially parallel to each other. This arrangement into two partial frame antennas can occur for any selection of the two or three frame antennas 1, 2, and 3. For reasons of a neat grouping, this is not completely disclosed in FIG. 2. According to the constructive design of the frame or partial frame antenna, they are not extensively arranged in a tier, but only essentially in a tier. It is also possible in a further embodiment of the present invention, as indicated in FIGS. 1a and 1b, that two or three frame antennas 1, 2 and 3 are interlaced.

Figure 4:
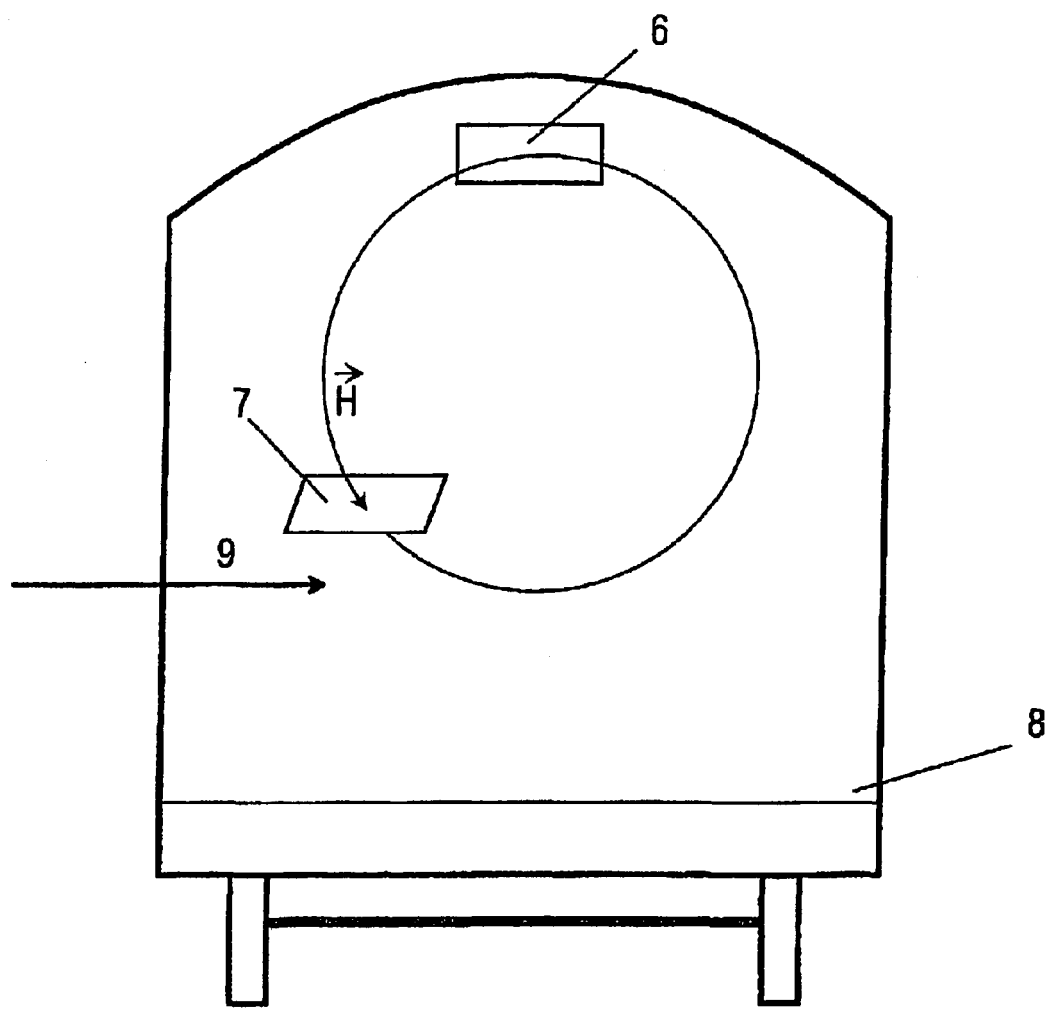
FIG. 4 depicts a positioning of an antenna array in the access area of a railway wagon.

The situation in the access area is shown in FIG. 4 at a determined time. For the tickets 7 to be actually prompted by the field $\vec{H}$ produced by the antenna array 5, the field lines $\vec{H}$ and in particular the flux density $\vec{B}$ which penetrate the surface of the ticket need to cause a minimal induction, which is proportional to the following integral:

$$\int_A B\, dA,$$

wherein A stands for the surface of the ticket 7.

According to the application, it is necessary that the prompting process is not limited to an access area, but should occur in a larger area of a room, for example in a railway wagon. In a further design of execution of the present invention, this task is solved by a multiple longitudinal positioning of the antenna cascading arrays $5_1, 5_2, 5_3$. The basis arrangement as well as the amount $H:=|\vec{H}|$ of the resulting quasi-isotropic field $\vec{H}$ can be taken from FIG. 5. While a transmitting unit 6 according to FIG. 6 is provided for the drive of a single antenna array 5, the drive of the individual antenna arrays $5_1, 5_2, 5_3$ can each occur passively with a four-wire-network (not disclosed), to receive an optimal quasi-isotropic alternating magnetic field along the arranged antenna arrays $5_1, 5_2, 5_3$. The four-wire-networks of the accommodating connection type 68 are thereby individually or in a series connected with a transmitting unit 6 according to FIG. 6. The phases of the individual currents $I_x$, $I_y$ and $I_z$ supplying the respective frame antennas can particularly be modified with the four-wire-network.

Figure 7:
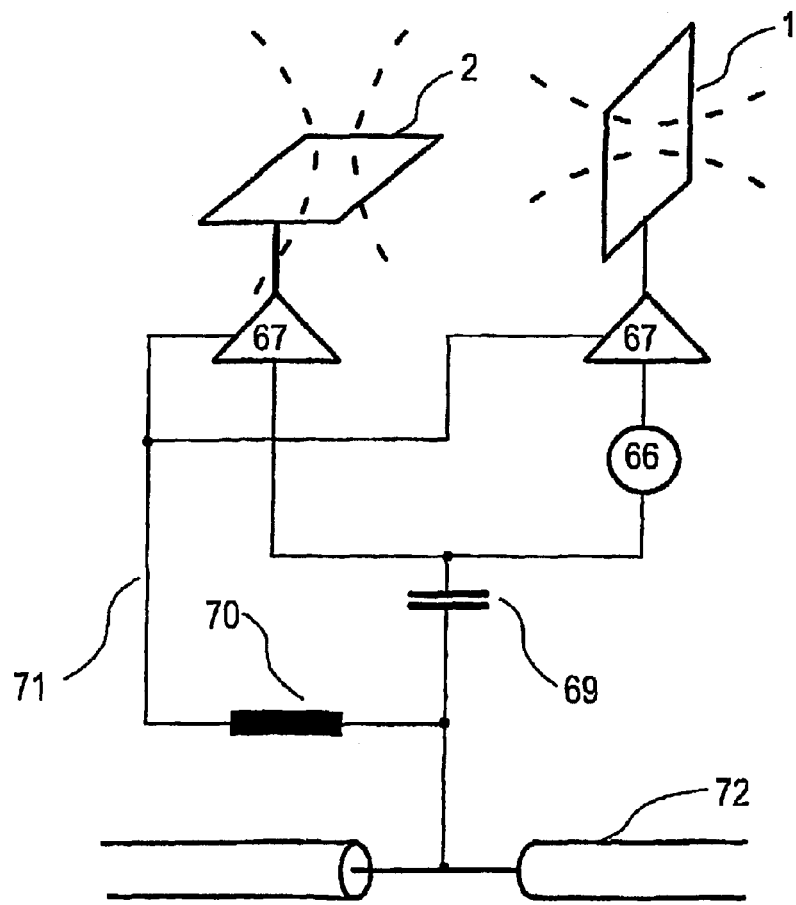
FIG. 7 depicts a modular mimic display with an active high-level stage for the production of a circular magnetic field.

Alternative to the above described passive antenna array, a modular mimic display with active high-level stage for the production of a circular and in particular quasi-isotropic magnet field is disclosed in FIG. 7. A coaxial cable 72 is installed in a longish room as for example a railway wagon, to which an antenna array with a modular mimic display according to FIG. 7 is connected in spacings of 3–5 m. An antenna amplifier 67 is provided for the two frame antennas 1 and 2, which is supplied with energy over a supply line 71 and an induction 70 from the coaxial cable 72. The one antenna amplifier 67 is topped by a phase shifting circuit 66, which shifts the signal by preferably II/2 into the phase. The phase shifting circuit 66 as well as the other antenna amplifier 67 are connected over a coupling capacitor 69 with the coaxial cable.

Figure 8:
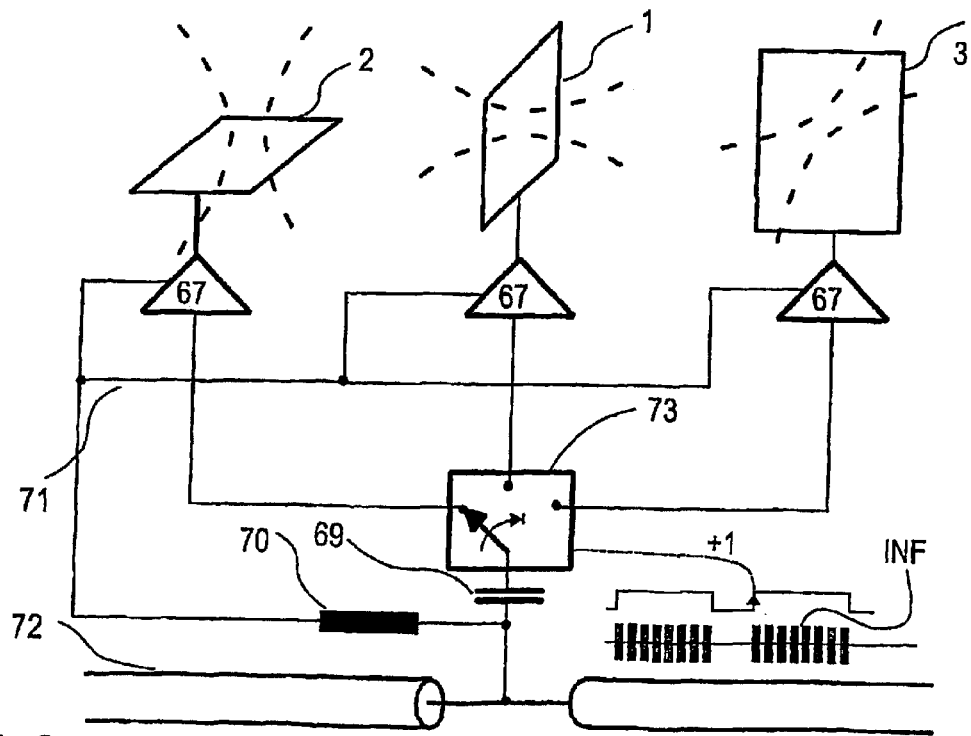
FIG. 8 depicts a modular mimic display with an active high-level stage connected to a switch unit for the production of a sequential isotropic magnetic field.

For a further embodiment of the present invention, it is referred to FIG. 8. In addition to the embodiment in FIG. 7, three frame antennas 1, 2 and 3 are provided according to a Cartesian coordinate system, which are each connected to an antenna amplifier 67. The supply with energy of the antenna amplifier 67 occurs the same way as already described in FIG. 7. The above mentioned information unit INF according to table 1 is preferably sent out periodically, for example in a time-slot-pattern of 70 ms to 30 ms; which means, that 70 ms are provided for the transmission of an information unit, following this no carrier signal is existent for 30 ms. Two such cycles for the sending out of an information unit are disclosed on the right on the bottom of FIG. 8.

A switch unit 73 is connected to the coaxial cable 72 over a coupling capacitor 69 herein. This switch unit 73 detects the existence of a carrier signal and switches cyclically from one antenna amplifier 67 to the next following at non-existence of a carrier signal. The sending out of the information units INF occurs therefore alternating by a frame antenna 1 in the yz-tier and in particular frame antenna 2 in the xz-tier and in particular frame antenna 3 in the xy-tier according to the disposition in FIG. 1a. A quasi-isotropic and in particular a sequential isotropic magnet field is thereby created, so that practically no positions of electronic tickets 7 are possible, in which insufficient field strength is available for the transmission of the information units INF. According to the geometry of the room to be supplied with a sequential-isotropic magnetic field, only two tiers for the frame antennas can be provided as well.

Figure 9:
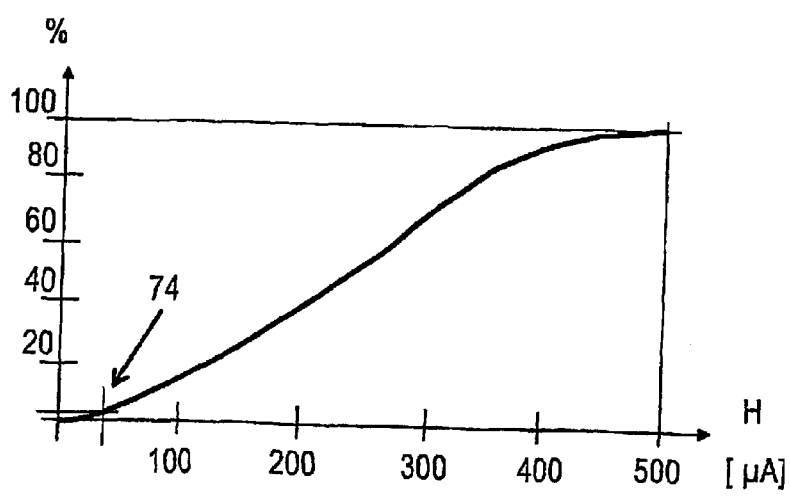
FIG. 9 depicts a distribution of the cumulated probability of an occurrence of field strength H.
Figure 5:
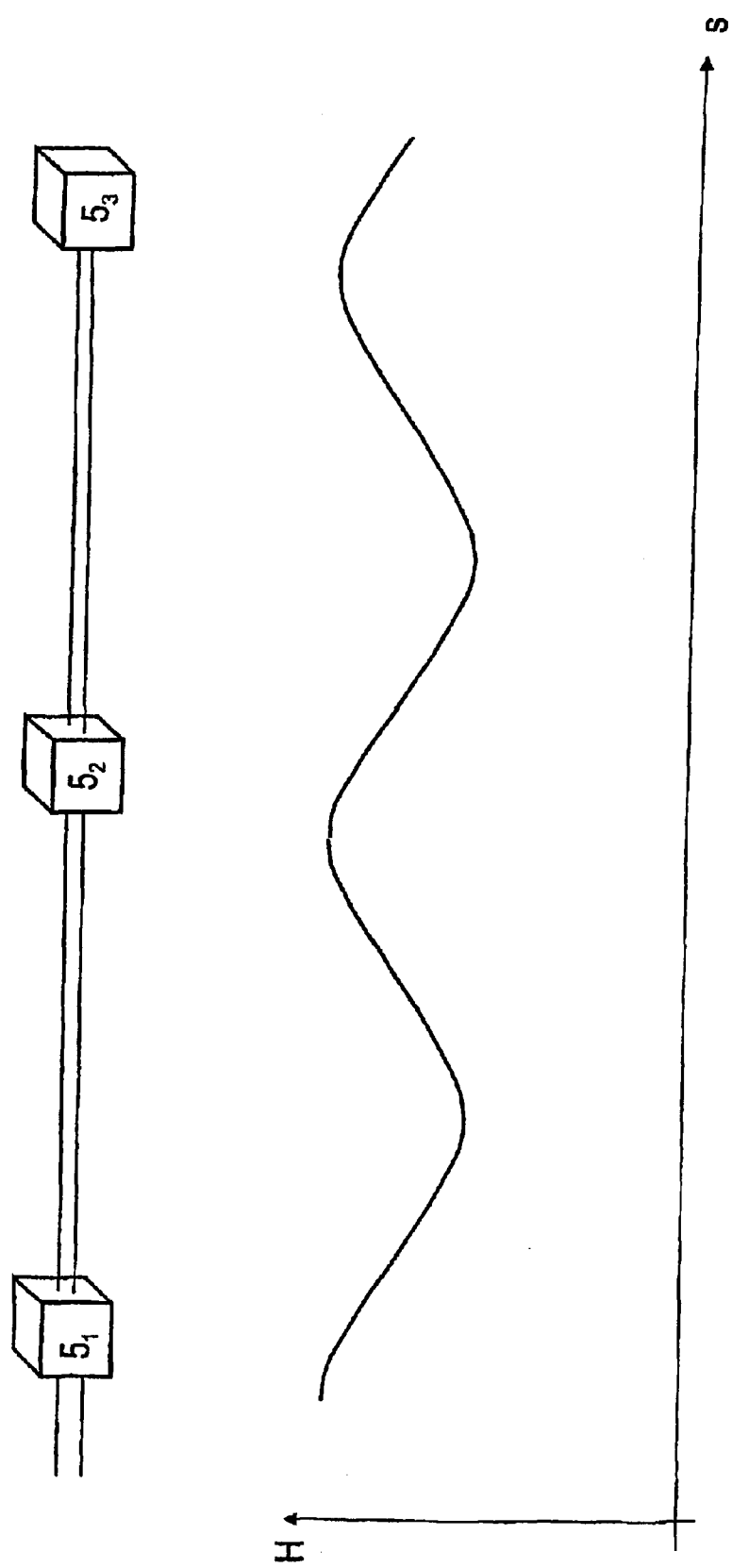
FIG. 5 depicts a course of the rate of the field strength H along a cascaded positioning of the antenna array with a wiring corresponding to the cascade.

In the cascade according to FIG. 5, the constructive identical antenna arrays $5_1, 5_2 \ldots$ are arranged alternating by II with a modular mimic display according to the FIGS. 6, 7 or 8 in a preferred embodiment. The distribution of the field strength in such a cascade with antenna units is disclosed in FIG. 9 according to FIG. 8. This distribution refers to a height of approx. 0,8 m above the floor of the railway wagon. The cascade is based on the rectangular lay-out of a railway wagon. It is assumed, that the electronic tickets 7 are based on a response level 74 of 40 $\mu$A, so that a ticket 7 is exposed with a high probability to a sufficient field strength, i.e. >40$\mu$A, the three-dimensional movement of the ticket by the movement of the concerned person is thereby not considered yet.

The invention being thus described, it will be obvious that the same may be varied in many ways. The variations are not to be regarded as a departure from the spirit and scope of the invention, and all such modifications as would be obvious to one skilled in the art are intended to be included within the scope of the following claims.

We claim:

1. A method for producing a magnetic alternating field for transmission of information units of an antenna array to a portable receiving module, which is freely movable in the magnetic alternating field, comprising the step of:

supplying information units to frame antennas of an antenna array, said frame antennas comprising at least one winding whereby tiers defined by said antenna arrays are pair-wise but not plane-parallel, said information units are sequentially alternated between said frame antennas by via on/off modulation whereby a quasi-isotropic magnetic field is radiated from said antenna array.

2. The method according to claim 1, further comprising the step of:

placing at least one of said frame antennas on a receiving module such that an induction for the reception of an information unit occurs on said at least one of said frame antennas.

3. The method according to claim 1, wherein said tiers defined by said frame antennas are essentially orthogonally adjustable towards each other and said frame antennas are interlaced.

4. The method according to claim 1, further comprising the steps of:

connecting several antenna arrays to a coaxial cable;

arranging said arrays so as to comprise cascading arrays; and producing a quasi-isotropic magnetic alternating field by a wiring which takes into account an opposite position of said antenna array.

5. The method according to claim 4, wherein said cascading arranged antenna arrays are constructively identical but that two sequential antenna arrays are positioned and turned by pi.

6. The method according to claim 5, further comprising the steps of:

generating an information unit by a connected oscillator and modulator, and supplying said information unit to said coaxial cable.

7. The method according to claim 1, wherein said frame antennas comprise three frame antennas.

8. The method according to claim 1, wherein said tiers defined by said frame antennas are essentially orthogonally adjustable towards each other or said frame antennas are interlaced.

9. The method according to claim 1, further comprising the steps of:

connecting several antenna arrays to a coaxial cable;

arranging said arrays so as to comprise cascading arrays; and producing a quasi-isotropic magnetic alternating field by a geometrical positioning of individual antenna arrays.

10. The method according to claim 9, wherein said cascading arranged antenna arrays are constructively identical but that two sequential antenna arrays are positioned and turned by pi.

11. The method according to claim 10, further comprising the steps of:

generating an information unit by a connected oscillator and modulator, and supplying said information unit to said coaxial cable.

* * * * *